(12) United States Patent
Käser et al.

(10) Patent No.: US 6,635,092 B2
(45) Date of Patent: Oct. 21, 2003

(54) DYE MIXTURES

(75) Inventors: Adolf Käser, Bottmingen (CH); Wolfgang Schlenker, Aesch (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/902,872

(22) Filed: Jul. 11, 2001

(65) Prior Publication Data

US 2002/0038484 A1 Apr. 4, 2002

Related U.S. Application Data

(63) Continuation-in-part of application No. 09/491,377, filed on Jan. 26, 2000, now abandoned.

(30) Foreign Application Priority Data

Jan. 29, 1999 (EP) .............................. 99101931

(51) Int. Cl.$^7$ .............. D06P 3/60; D06P 3/62
(52) U.S. Cl. .................... 8/641; 8/687; 8/919
(58) Field of Search .................... 8/919, 641, 687

(56) References Cited

U.S. PATENT DOCUMENTS 4,875,903 A  10/1989  Pedrazzi ................. 8/640
5,288,294 A  2/1994  Käser ...................... 8/687

FOREIGN PATENT DOCUMENTS

| CH | 614458 | 11/1979 |
| EP | 0851004 | 7/1998 |
| EP | 0919596 | 6/1999 |
| JP | 0182982 | 3/1989 |
| JP | 2220884 | * 9/1990 |

OTHER PUBLICATIONS

Abstract for EP 0919596 (Jun. 1999).
Abstract for EP 0851004 (Jul. 1998).
Abstract for CH 614458 (Nov. 1979).

* cited by examiner

*Primary Examiner*—Margaret Einsmann
(74) *Attorney, Agent, or Firm*—Kevin T. Mansfield

(57) ABSTRACT

Disclosed are dye mixtures for shading white paper which may contain fluorescent brightener. The dye mixtures comprise a violet dye according to the formula (1) or (2) indicated in claim 1 and sufficient of a red, blue or further violet anionic azo dye that this dye mixture is capable of producing in the Cielab color co-ordinates system a relative hue angle of 270 to 295° when the dyeing contains 0.00005 to 0.005% by weight of dye, based on the weight of the paper, with the proviso that the value 0.005% is excluded.

4 Claims, No Drawings

DYE MIXTURES

This is a continuation-in-part of application Ser. No. 09/491,377, filed Jan. 26, 2000 now abandoned.

The present invention relates to violet dye mixtures for shading paper.

Optically brightened white paper is customarily shaded in commercial practice using violet dyes of high brilliance whose hue lies within a closely defined domain. Some of these dyes do afford the shade sought, but have certain undesirable properties. For instance, the water solubility of their sodium salts is poor, necessitating complicated measures to convert them into more soluble salts if concentrated aqueous formulations are to be produced, and/or their dilute stock solutions tend to throw substantial precipitates even in water of just 10° German hardness. It is true that modifying the dyes by introducing an additional sulfo group reduces the disadvantages mentioned, but it also leads to an unwelcome reduction in affinity.

There is therefore a need for violet dyes for shading paper which afford the shade sought without having the aforementioned disadvantages. Shading is to be understood as meaning the treating with dyes in such an amount that, although the dyeing obtained is virtually invisible, other properties, for example the brilliance or brightness of white paper, are improved. The amounts of dye used are approximately between 0.5 and 100 g, preferably between 1 and 50 g, of pure dye per tonne of paper.

It has now been found that certain dye mixtures have the desired properties. Surprisingly, at the concentrations used in shading, the brilliance of the dyeings obtained is similar to that obtained with the individual components, whereas it is known that dye mixtures normally produce distinctly duller dyeings. The dye mixtures of the invention are additionally notable for good water solubility and stability to hard water.

The present invention accordingly provides violet dye mixtures for shading paper, comprising a violet dye of the formula

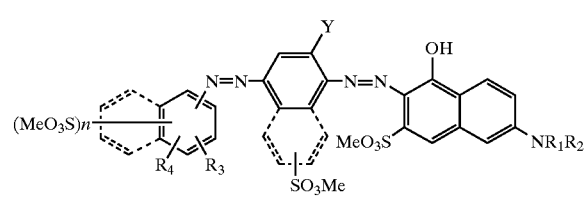

(1)

or

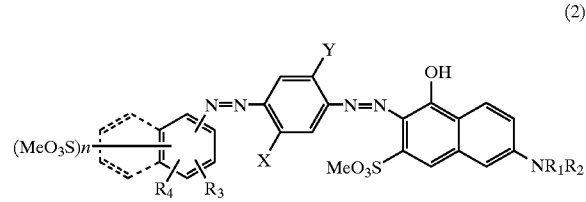

(2)

where $R_1$ is hydrogen or alkyl, $R_2$ is hydrogen, alkyl or substituted or unsubstituted aryl, $R_3$ and $R_4$ are independently hydrogen or alkyl, X and Y are independently hydrogen, alkyl or alkoxy, n is 1 or 2, and Me is hydrogen or one equivalent of a colourless cation, and sufficient of a red, blue or further violet anionic azo dye that this dye mixture produces in the Cielab colour co-ordinates system a relative hue angle of 270 to 295° when the dyeing contains 0.00005 to 0.005% by weight of dye, based on the weight of the paper, with the proviso that the value of 0.005% is excluded.

Furthermore, suitable weight ratios of the violet dye of formula (1) or (2) to the red, blue or further violet anionic azo dye, according to the invention, have been found to lie within the range of between 98 to 2 parts and 40 to 60 parts, ratios of between 95 to 5 parts and 60 to 40 parts being preferred.

The dye mixture according to the invention is preferably employed in an amount to produce a dyeing which contains between 0.00005 and 0.004%, more preferably between 0.00005 and 0.003% and, most preferably, between 0.001 and 0.002% by weight of dye, based on the weight of the paper.

In the dyes of the formulae (1) and (2), alkyl is especially $C_1$–$C_4$alkyl, for example methyl, ethyl, n-propyl, isopropyl, n-butyl, sec-butyl, isobutyl and tert-butyl.

Alkoxy is in particular $C_1$–$C_4$alkoxy, for example methoxy, ethoxy, n-propoxy, isopropoxy, n-butoxy, sec-butoxy, isobutoxy and tert-butoxy.

Aryl is for example naphthyl or especially phenyl, and these radicals may be substituted, for example by alkyl, alkoxy, sulfo, carboxyl, halogen, alkylcarbonylamino or alkoxycarbonyl.

Me is hydrogen or one equivalent of a colourless cation, for example lithium, sodium, potassium, ammonium or the protonated form of a $C_4$–$C_{12}$trialkylamine, of a $C_4$–$C_{12}$diamine, of a $C_2$–$C_{15}$alkanolamine or of a polyglycolamine. Preferably Me is hydrogen or sodium.

The absolute hue angle is defined in the Cielab system by the colour co-ordinates a* and b* (Colorimetry, second Edition, Publication CIE No. 15.2 (1986). The values in the present application relate to the relative hue angle, which is based on the colour co-ordinates of the unshaded and unbrightened base paper. When calculating the relative hue angle, the absolute a* and b* values are replaced by the differences from the base paper (a*–a*$_0$) and (b*–b*$_0$). All the values of the relative hue angle are based on the small dye quantities which are used for shading white paper.

The process of the invention is preferably carried out using a dye mixture of such composition that a paper dyeing with this dye mixture in the stated concentration produces a relative hue angle of 275 to 285°.

Particularly preferred violet dyes conform to the formula

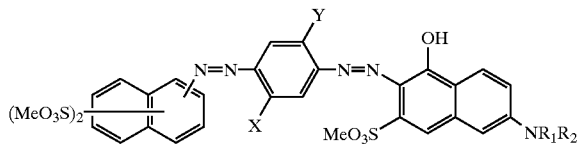
(3)

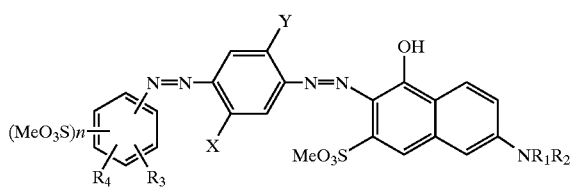
(4)

wherein

X is hydrogen or $C_1$–$C_2$alkyl,
Y is hydrogen or $C_1$–$C_2$alkoxy,
$R_1$ is hydrogen or $C_1$–$C_2$alkyl,
$R_2$ is hydrogen, $C_1$–$C_2$alkyl or phenyl,
$R_3$ and $R_4$ are independently hydrogen or $C_1$–$C_2$alkyl, and
Me is hydrogen, sodium, lithium or an organic ammonium or alkanolammonium cation.

and of the formula

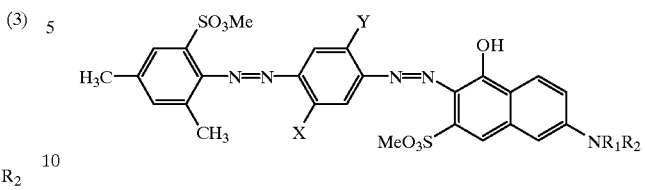
(6)

wherein
X and Y are independently hydrogen, $C_1$–$C_2$alkyl or $C_1$–$C_2$alkoxy,
$R_1$ is hydrogen or $C_1$–$C_2$alkyl,
$R_2$ is hydrogen, $C_1$–$C_2$alkyl or phenyl, and
Me is hydrogen, sodium or an organic ammonium or alkanolammonium cation.

The second component included in the dye mixtures of the invention is a red, blue or further violet dye which shifts the shade of the dyeing with the dye of the formula (1) or (2) in such a way that the net effect is to produce a desired relative hue angle of 270 to 295°. Suitable dyes are in particular the anionic dyes used in the paper industry. In general, such dyes are classified as Direct Dyes, as exemplified in the Colour Index and are anionic mono- or, especially, bis-azo compounds.

Preference is given to red dyes of the formula

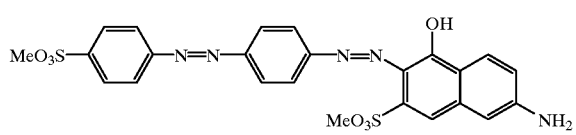
(7)

or of the formula

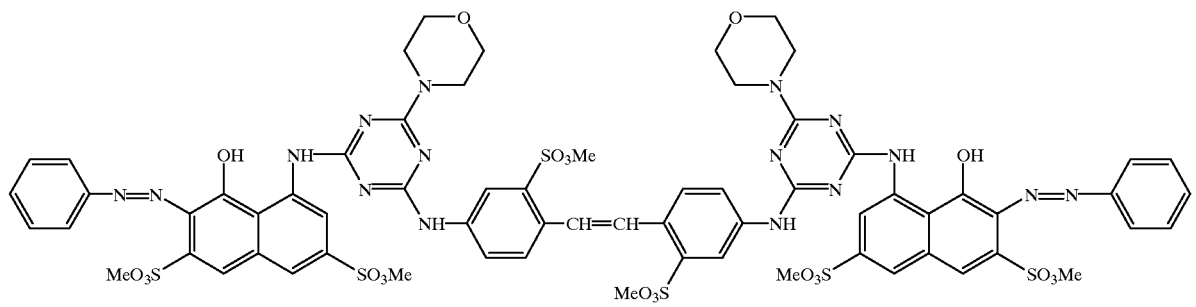
(8)

Of these dyes, particular preference is given to the violet dyes of the formula

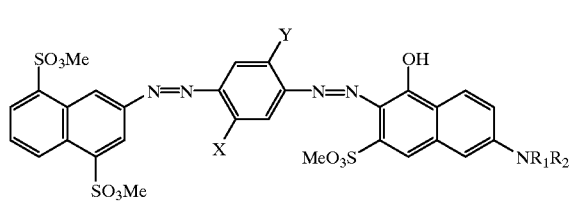
(5)

whilst especially useful further violet anionic azo dyes are those of the formula

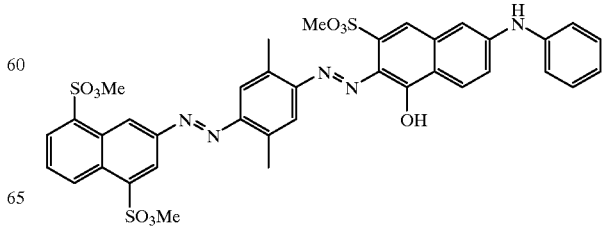
(9)

and blue anionic azo dyes those of the formula

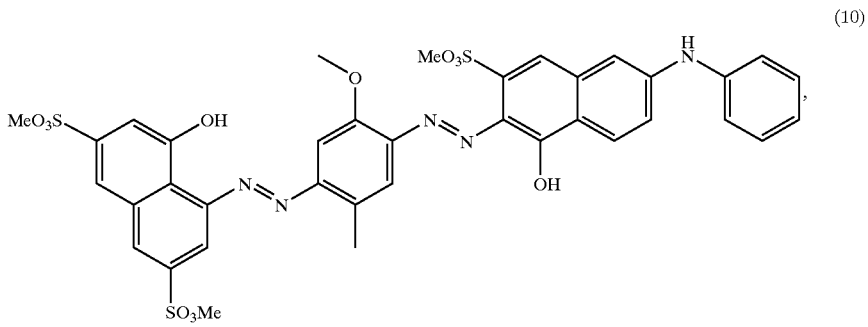

(10)

wherein

Me is hydrogen, sodium or an organic ammonium or alkanolammonium cation.

The violet dyes of the formulae (1) to (6) and (9) and also the red dyes of the formulae (7) and (8) and the blue shading dyes of formula (10) are known or can be prepared in a manner known per se.

Especially useful combinations of dyes according to the invention are, for example, C.I. Direct Violet 35 together with C.I. Direct Red 254, C.I. Direct Red 227, C.I. Direct Violet 26 or C.I. Direct Violet 51, C.I. Direct Violet 26 together with C.I. Direct Blue 67, C.I. Direct Blue 279 or C.I. Direct Blue 290 and C.I. Direct Violet 51 together with C.I. Direct Blue 67, C.I. Direct Blue 273 or C.I. Direct Blue 290.

The dye mixtures of the invention are particularly useful for shading paper, especially paper containing optical brightener. They are preferably used as solid or liquid commercial form.

The pulverulent or granular form of the dye mixtures is used particularly in batchwise pulp dyeing where the dye mixture, customarily in the form of a stock solution, is added in the pulper, in the beater or in the mixing chest. Preference is here given to using dye preparations which as well as the dye mixtures, may further include extenders, for example urea as solubilizer, dextrin, Glauber salt, sodium chloride and also dispersants, dust-proofing agents and sequestrants, such as tetra-sodium phosphate.

The present invention accordingly further provides solid dye preparations for dyeing paper which include a dye mixture according to the invention.

In recent years, the use of concentrated aqueous solutions of dyes has gained importance because of the advantages possessed by such solutions when compared with dyes in powder form. The use of solutions avoids the difficulties associated with dust formation and releases the user from the time-consuming and frequently difficult dissolving of the dye powder in water. The use of concentrated solutions was also prompted by the development of continuous dyeing processes for paper, since it is convenient in these processes to meter the solution directly into the pulp stream or to add it at some other suitable point of the paper-making process.

The present invention accordingly further provides concentrated aqueous dye mixture solutions for dyeing paper which contain from 5 to 30% by weight, based on the total weight of the solution, of a dye mixture according to the invention.

The concentrated solutions preferably contain a low level of inorganic salts, which may be achieved, if necessary, by known methods, for example reverse osmosis.

The concentrated solutions may include further auxiliaries, for example solubilizers such as ε-caprolactam or urea, organic solvents, for example glycols, polyethylene glycols, dimethyl sulfoxide, N-methylpyrrolidone, acetamide, alkanolamines or polyglycolamines.

In the Examples hereinbelow, parts and percentages are by weight and temperatures are recorded in degrees Celsius. The reported quantities are based on pure dye, reckoned as free acid.

EXAMPLES 1–5

The shade (or the relative hue angle of 275° in the Cielab colour co-ordinates system) of the dye C.I. Direct Violet 9, which is considered an ideal dye for shading paper, is exactly reproduced with a mixture consisting of the violet dye C.I. Direct Violet 35 of the formula

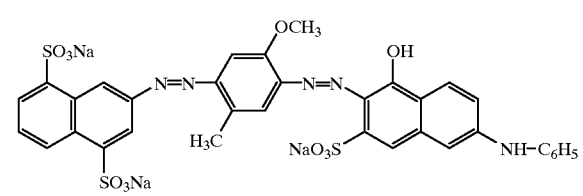

(100)

and the red dye Direct Red 254 of the formula

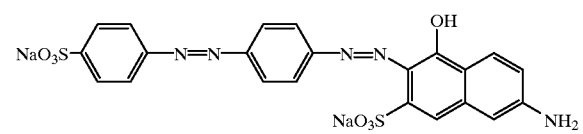

(101)

or the red dye Direct Red 227 of the formula

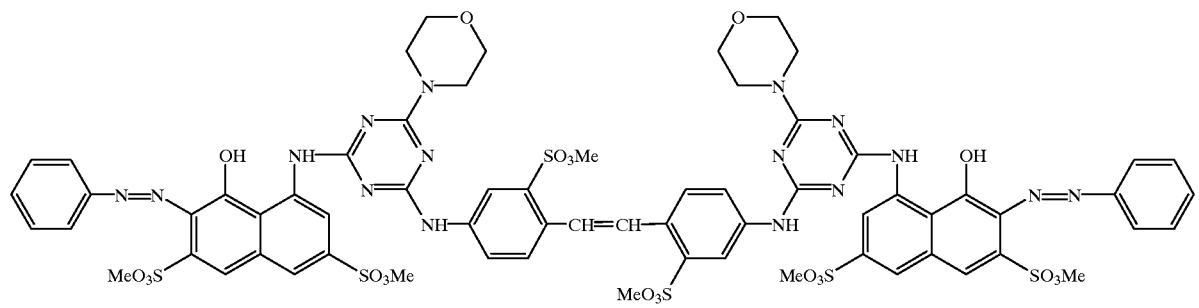

(102)

or the urther violet dye Direct Violet 26 of the formula (103)

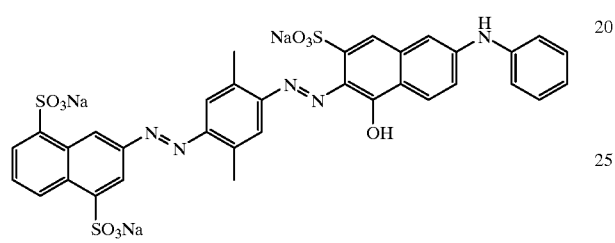

and, alternatively, with a mixture consisting of Direct Violet 26 and the blue anionic azo dye Direct Blue 67 of the formula

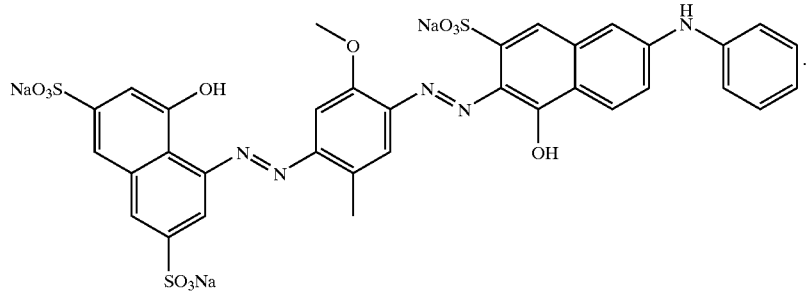

(104)

Table 1 below shows the values obtained for the shading dyeings of paper.

TABLE 1

| Ex. | Dye (without opt. brightener) | CIELAB co-ordinates | | | Whiteness | | Rel. hue angle |
|---|---|---|---|---|---|---|---|
| | | $L^*$ | $a^*$ | $b^*$ | $B_{ISO}$ | $W_{CIE}$ | h |
| 1 | 0.0008% of Direct Violet 9 (reference dyeing) | 93.4 | 0.6 | 0.2 | 84.0 | 82.9 | 277° |
| 2 | 0.001040% of Direct Violet 35 + 0.000078% of Direct Red 254 | 93.2 | 0.7 | 0.1 | 83.7 | 83.1 | 278° |
| 3 | 0.000949% of Direct Violet 35 + 0.000475% of Direct Red 227 | 93.4 | 0.7 | 0.4 | 83.8 | 82.1 | 279° |
| 4 | 0.000767% of Direct Violet 35 + 0.000255% of Direct Violet 26 | 93.3 | 0.7 | 0.2 | 83.8 | 82.8 | 279° |
| 5 | 0.000680% of Direct Violet 26 + 0.000440% of Direct Blue 67 | 93.3 | 0.7 | 0.2 | 83.8 | 82.9 | 279° |

The shadings with the dye mixtures differ only minimally in both the shade and the whiteness from the shading with the reference dye Direct Violet 9.

EXAMPLES 6–8

Examples 1–5 are repeated using in addition 0.25% by weight, based on the paper weight, of the optical brightener of formula

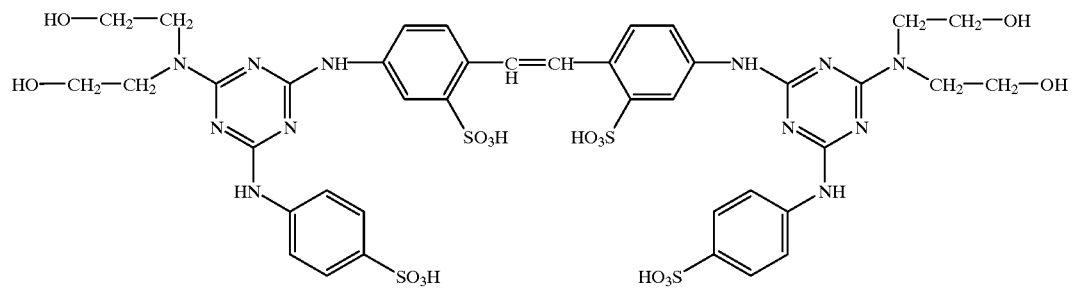

The values reported below in Table 2 are obtained.

TABLE 2

| | CIELAB co-ordinates | | | Whiteness | | Rel. hue angle |
|---|---|---|---|---|---|---|
| Ex. Dye + 0.25% of opt. brightener | L* | a* | b* | $B_{ISO}$ | $W_{CIE}$ | h |
| 6  0.0008% of Direct Violet 9 | 94.2 | 3.2 | −8.3 | 96.6 | 123.3 | 284° |
| 7  0.001040% of Direct Violet 35 + 0.000078% of Direct Red 254 | 94.0 | 3.1 | −8.3 | 96.1 | 122.8 | 284° |
| 8  0.000949% of Direct Violet 35 + 0.000475% of Direct Red 227 | 94.1 | 3.2 | −8.1 | 96.2 | 122.2 | 284° |

The shadings with the dye mixtures differ only minimally in both the shade and the whiteness from the shading with the reference dye Direct Violet 9.

EXAMPLES 9–11

Examples 1–5 are repeated using an additional 0.75% by weight, based on the paper weight, of the optical brightener used in Examples 6 to 8. The values reported below in Table 3 are obtained.

TABLE 3

| | CIELAB co-ordinates | | | Whiteness | | Rel. hue angle |
|---|---|---|---|---|---|---|
| Ex. Dye + 0.75% of opt. brightener | L* | a* | b* | $B_{ISO}$ | $W_{CIE}$ | h |
| 9  0.0008% of Direct Violet 9 | 94.6 | 3.8 | −11.3 | 102.0 | 137.2 | 283° |
| 10  0.001040% of Direct Violet 35 + 0.000078% of Direct Red 254 | 94.4 | 3.8 | −11.3 | 101.7 | 137.1 | 283° |
| 11  0.000949% of Direct Violet 35 + 0.000475% of Direct Red 227 | 94.5 | 4.0 | −11.6 | 102.3 | 138.4 | 284° |

The shadings with the dye mixtures differ only minimally in both the shade and the whiteness from the shading with the reference dye.

EXAMPLES 12–15

Table 4 below reports the stability of aqueous formulations of the dye Direct Violet 9 in comparison with dye mixtures of the invention:

TABLE 4

| Ex. | Dye (in each case as sodium salt) | % dye formulated in $H_2O$ | Stability of formulation at $-10°$ C. to $40°$ C. |
|---|---|---|---|
| 12 | Direct Violet 9 | 10% by weight | does not dissolve completely |
| 13 | 93% Direct Violet 35 + 7% Direct Red 254 | about 11% by weight | sediment-free for at least 2 months |
| 14 | 67% Direct Violet 35 + 33% Direct Red 227 | 11% by weight | sediment-free for at least 2 months |
| 15 | 61% Direct Violet 35 + 39% Direct Blue 67 | about 7% by weight | sediment-free for at least 2 months |

EXAMPLES 16–20

Table 5 below reports the stability in hard water (10° German hardness) of a 1–10% stock solution of aqueous formulations of the dye Direct Violet 9 in comparison with dye mixtures of the invention. The formulations were prepared as described in Example 29:

TABLE 5

| Ex. | Dye (in each case as sodium salt) | Strength of formulation | Stability of 1–10% stock solution prepared with liquid formulation |
|---|---|---|---|
| 16 | Direct Violet 9 | 16% by weight | precipitates at once |
| 17 | 93% Direct Violet 35 + 7% Direct Red 254 | about 11% by weight | more than 1 week |
| 18 | 67% Direct Violet 35 + 33% Direct Red 227 | about 11% by weight | more than 1 week |
| 19 | 75% Direct Violet 35 + 25% Direct Violet 26 | about 15% by weight | some hours |

EXAMPLE 20

A pulp mixture with 50% sulfate long fibre and 50% sulfite short fibre (bleached), beaten in a refiner to 35° Schopper Riegler is dispersed in an amount of 10 parts, based on dry content, in 460 parts of water and 1.2 parts of calcium carbonate (Omyalite OM 50) in the course of one hour.

Thereafter, for a dye use level of 8 g pert of fibre, 5 parts of a 0.0016% dye stock solution are added, making 0.00008 g of dye according to Example 1 per 10 g of fibre. After 15 min 0.2 part of Aquapel 320 is added, followed by 0.005 part of Percol 155. The pulp is then diluted to 1000 parts with water and used to make paper.

EXAMPLES 21–24

To pulp slurry samples containing 10 g of the fibre prepared in Example 20, based on dry fibre content, in place of 0.00008 g of dye according to Example 1 there are added the corresponding amounts of dye mixtures according to Examples 2, 3, 4 or 5. The pulp is then diluted to 1000 parts with water and used to make paper as in Example 20. The shadings with the dye mixtures according to Examples 2, 3, 4 or 5 differ only minimally in both the shade and the whiteness from the shading with the reference dye.

What is claimed is:

1. A concentrated aqueous dye mixture solution for shading white paper, comprising 5 to 30% by weight, based on the total weight of the solution, of a dye mixture comprising a violet dye of the formula

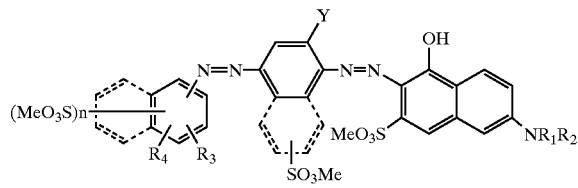

(1)

or

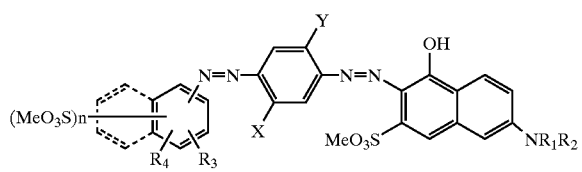

(2)

where
$R_1$ is hydrogen or alkyl,
$R_2$ is hydrogen, alkyl or substituted or unsubstituted aryl,
$R_3$ and $R_4$ are independently hydrogen or alkyl,
X and Y are independently hydrogen, alkyl or alkoxy,
n is 1 or 2, and
Me is hydrogen or one equivalent of a colourless cation, and sufficient of a red, blue or further violet anionic azo dye that this dye mixture producies, in the Cielab colour coordinates system a relative hue angle of 270 to 295° when the dyeing contains 0.00005 to 0.005% by weight of dye, based on the weight of the paper, whereby the weight ratios of the violet dye of the formula (1) or (2) to the red, blue or further violet anionic azo dye lie within the range of between 98 to 2 parts and 40–60 parts.

2. A concentrated aqueous solution according to claim 1, comprising further auxiliaries selected from the group consisting of solubilizers and organic solvents.

3. A process for shading white paper, which comprises dyeing the paper with a concentrated aqueous solution according to claim 1 comprising 0.5 to 100 g of pure dye per tonne of paper.

4. A process according to claim 3 for shading white paper comprising adding an optical brightener to the dye mixture.

* * * * *